Dec. 21, 1948.  E. W. KELLOGG  2,456,708
APPARATUS FOR IMPROVING THE DURABILITY
OF OPTICAL COATINGS
Filed May 1, 1944
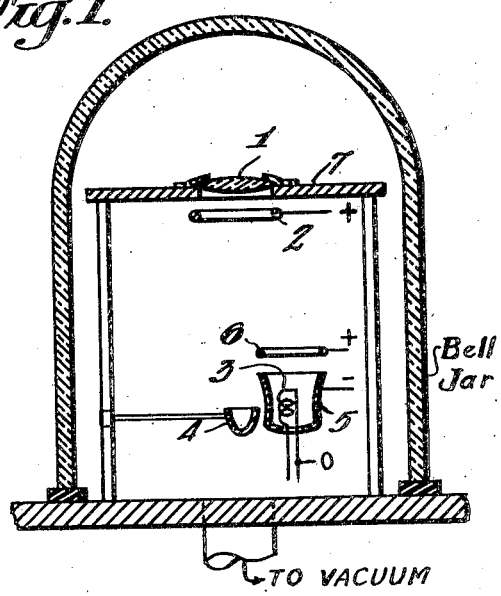
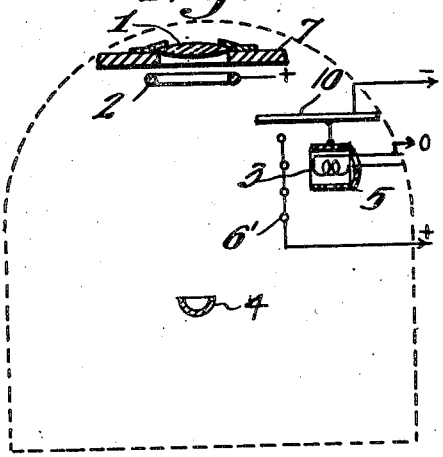
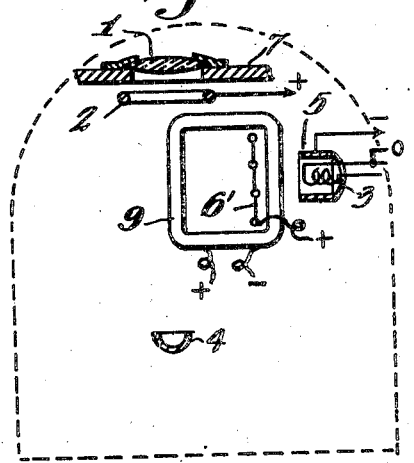
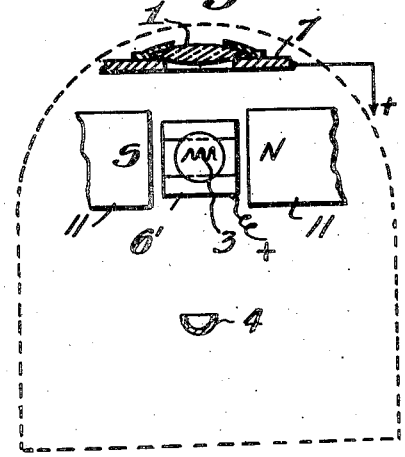
WITNESS:
F. J. Harbaugh
Inventor
Edward W. Kellogg
By
Attorney

UNITED STATES PATENT OFFICE 2,456,708

APPARATUS FOR IMPROVING THE DURABILITY OF OPTICAL COATINGS

Edward W. Kellogg, Indianapolis, Ind., assignor to Radio Corporation of America, a corporation of Delaware Application May 1, 1944, Serial No. 533,554

5 Claims. (Cl. 91—12.2)

This invention relates to thin coatings on optical surfaces and to, more particularly, apparatus for improving the hardness and durability of such coatings, especially coatings used for reducing reflection from surfaces of light-transmitting bodies, and coatings for protecting reflecting surfaces.

An object of the invention is to provide improved apparatus for producing on the surface of an optical article an improved coating that is highly resistant to abrasion and the action of water.

Another object of the invention is to provide apparatus for producing an improved transparent film on the surface of an optical object, using a process which renders said film hard and durable without deleteriously affecting said object.

Still another object of the invention is to provide apparatus for substantially improving the hardness and durability of a thermally deposited film without substantially raising the temperature of said object.

Further additional objects and advantages not heretofore specified will become apparent from the following detailed description. Referring to the drawings, Figure 1 is a side elevation view of a bell jar, arranged to be evacuated, and enclosed apparatus embodying the invention, Figure 2 is a schematic side elevation view, partly in section, of a modification of the apparatus shown in Fig. 1, embodying the invention, the bell jar being omitted by way of simplifying the drawing, Figure 3 is a side elevation view, partly in section, of a modification, in accordance with the invention, of the apparatus shown in Figs. 1 and 2, and Figure 4 is a side elevation view of a further modification of the invention.

It is well known to those skilled in the art that harder deposits or coatings of such material as magnesium fluoride used for reducing reflection from optical surfaces such as glass, can be obtained by baking the glass after deposit, and still denser deposit results if heat is applied prior to the deposit, so that the glass is hot during the deposit. This requires supplying heat to the glass while it is in the evacuated treatment chamber. Radiant heat has been employed for this purpose, but the radiant heat is absorbed and converted into sensible heat throughout the body of the glass, making the parts of the glass where heat is not wanted just as hot or hotter than the surface where the layer of coating material is being applied. There is a distinct drawback to the production of unnecessary heat in the interior of the glass, for the reason that this makes it out of the question to apply the treatment to cemented doublet lenses. The only method up to the present by which cemented lenses can be given the benefit of thermally deposited reflection-reducing coatings is either to so restrict the temperature as not to injure the cement and, at the same time, lose much of the hardening effect of the heat, or else to coat the elements separately and then cement them together. This last method has obvious disadvantages from the cost of manufacture standpoint, and scarcely solves the problem of treating existing cemented lenses.

Another drawback to the radiant heat method of hardening the deposit is that the relative transparency of the glass to the heat rays means that only part of the heat is absorbed, and this makes the process slow; while the evolution of the great excess of heat energy in the vacuum chamber causes the freeing of large quantities of adsorbed gas, so that greater difficulty is encountered in reaching and maintaining a good vacuum.

According to the present invention, the surface of the glass to which the coating is applied is bombarded with high velocity electrons. The advantages of using electrons are that their movements can be readily and accurately controlled and directed, and their speed predetermined, and that an abundant supply may be had without prejudice to the desired high vacuum. With the bombardment method, all the heat that is generated is localized at the surface, except as it penetrates to the interior by conduction.

The manner of directing the desired electron stream will be understood by reference to the drawings in connection with the following description and explanation.

A collector electrode or ring 2 is located near an optical body or glass lens 1, but where it will not obstruct the paths of the molecules of mineral, and a source 3 of electrons is provided. An apertured metallic plate 7 supports the body. Plate 7 may take the place of electrode 2, as in Fig. 4. The collector or anode 2 is at high positive potential with reference to the source or cathode 3. A crucible, in which the mineral to be evaporated is placed, is shown at 4. Electrical heating means are provided for crucible 4, but are not shown. A directing ring or cup 5 may be located closely around cathode 3 to start the electrons in the right direction. Ring 5 would normally be negative with respect to the cathode 3 by a relatively small voltage, say 30 volts. An accelerating electrode or ring 6 may be used to help reduce space charge over cathode 3. Electrode 6 would be positive with respect to cathode 3 by a substantial voltage, say of the order of several hundred volts, e. g. 1000 volts; while ring 2 is preferably at a still higher positive potential, e. g. 5000 volts. Cathode 3 is the reference potential, shown at 0 (zero) volts. The conformation of the electrodes and the relative potentials to be applied to each constitute a design problem of a type with which engineers engaged in cathode ray tube and television tube design are familiar, and will vary with different conditions.

When electrons strike the lower surface of the optical glass body 1, they produce intense local disturbance (heat) and also cause the emission from the surface of secondary electrons. In view of the fact that the glass is an electrical insulator and there is, therefore, no way of conductively removing the primary electrons, dependence must be placed on secondary emission for maintaining the surface at a positive potential. Most of the secondaries return to the glass surface, but a number of secondaries equal to the primaries must be drawn away, otherwise the surface of the glass would soon be at negative potential. As soon as the excess of primaries has dropped the potential of the surface a relatively small amount, say 100 to 200 volts below electrode 2, there is established a reverse electric field between the glass and electrode 2, which draws away enough secondaries to maintain equilibrium. In order not to obstruct the paths of the molecules being evaporated from crucible 4 to optical body 1, the electron equipment may be located to one side, as shown in Figs. 2 and 3.

In Fig. 2 a negatively charged shield 10, which may be of same potential as shield 5, or may be independently adjustable for optimum value, causes the electric field between cathode 3 and the plate 7 to be curved; and by adjusting the potentials of electrodes 5, 10, 6', 2 or 7 with respect to cathode 3, the direction of the electron stream may be controlled. A still more effective way of controlling the paths of the electrons is with a magnetic field.

A pair of spaced coaxial coils, one of which is shown at 9, connected in series aiding relation, produces a deflecting field. Instead of a pair of coils, a magnet whose poles are shown at 11, 11 may be used (Fig. 4) to produce the transverse magnetic field. It is sufficient and practical in some arrangements to supply positive voltage to the metal supporting structure 7, instead of employing a separate anode 2 as in Figs. 1 to 3.

While the rates of energy supply must exceed certain minimum values, upper values will be found which must not be exceeded. It is known, for example, that chemical changes can be produced in some materials by bombardment with electrons of sufficient energy. Thus, for any given material and arrangement of equipment, the best combination of voltage, current and time must be selected to produce the maximum of the desired hardening effect while avoiding deleterious effects.

The invention has particular utility when used in treating films deposited upon optical surfaces of bodies, such as cemented doublets, that are deleteriously affected if heated by previously used methods to such high temperatures as are found desirable (when no restrictions are imposed, as for example in coating simple glass elements) for producing optimum hardening of the film.

I claim as my invention:

1. In apparatus for producing a thin durable layer upon an optical glass surface of a body, an evacuated chamber arranged to removably receive said body, means for evacuating said chamber, means for supporting said body in said chamber, means for vaporizing material within said chamber, a source of electrons within said chamber, said source comprising thermal responsive means located within said chamber and positioned from said vaporizing means, and means for generating an electrical field within said chamber, said field being adjacent the path of the electrons for directing the stream of electrons from said source to said coated surface, whereby said layer is hardened.

2. Apparatus according to claim 1 in which said means for generating an electrical field is positioned such that said electrical field is substantially normal to said surface to deflect said electrons into a path substantially normal to said surface.

3. The apparatus of claim 1 in which said means for generating a field comprises said support means connected as a collector anode adjacent said surface.

4. Apparatus according to claim 1 in which said source of electrons is positioned laterally of the path between said vaporized means and said surface.

5. Apparatus according to claim 1 in which said means for generating an electrical field includes a collector electrode positioned adjacent said surface.

EDWARD W. KELLOGG.

REFERENCES CITED

The following references are of record in the file of this patent:

UNITED STATES PATENTS

| Number | Name | Date |
|---|---|---|
| 1,965,582 | Faulke | July 10, 1934 |
| 1,965,587 | Faulke | July 10, 1934 |
| 2,164,595 | Siebertz | July 4, 1939 |
| 2,178,233 | Klatzow | Oct. 31, 1939 |
| 2,239,642 | Burkhardt et al. | Apr. 22, 1941 |
| 2,281,638 | Sukumlyn | May 5, 1942 |
| 2,301,456 | Sabine | Nov. 10, 1942 |
| 2,391,595 | Richards et al. | Dec. 25, 1945 |

FOREIGN PATENTS

| Number | Country | Date |
|---|---|---|
| 510,404 | Great Britain | Aug. 1, 1939 |